US008654956B2

(12) United States Patent
Ryan, III et al.

(10) Patent No.: US 8,654,956 B2
(45) Date of Patent: Feb. 18, 2014

(54) METHOD AND APPARATUS FOR TREATING POTENTIALLY UNAUTHORIZED CALLS

(75) Inventors: William Ryan, III, Greensboro, NC (US); Wesley L. Apple, Elon, NC (US); Dan Apple, legal representative, Elon, NC (US); Charles David Orr, Burlington, NC (US); Timothy Edwin Pabon, Greensboro, NC (US); John Vincent Townsend, III, Kernersville, NC (US)

(73) Assignee: Confinement Telephony Technology, LLC, Greensboro, NC (US)

( * ) Notice: Subject to any disclaimer, the term of this patent is extended or adjusted under 35 U.S.C. 154(b) by 573 days.

(21) Appl. No.: 12/378,507

(22) Filed: Feb. 17, 2009

(65) Prior Publication Data
US 2009/0207987 A1    Aug. 20, 2009

Related U.S. Application Data

(60) Provisional application No. 61/065,991, filed on Feb. 15, 2008.

(51) Int. Cl.
  *H04M 3/42* (2006.01)
(52) U.S. Cl.
  USPC .............. 379/207.01; 379/202.01; 379/210.02
(58) Field of Classification Search
  USPC .................................... 379/188–200; 455/565
  See application file for complete search history.

(56) References Cited

U.S. PATENT DOCUMENTS

| 6,353,663 | B1 * | 3/2002 | Stevens et al. | 379/114.22 |
| 7,664,243 | B2 * | 2/2010 | Martin | 379/189 |
| 2006/0171517 | A1 * | 8/2006 | Link et al. | 379/114.21 |
| 2006/0293054 | A1 * | 12/2006 | Obata et al. | 455/436 |
| 2007/0071206 | A1 * | 3/2007 | Gainsboro et al. | 379/168 |

OTHER PUBLICATIONS

State of Florida, Public Service Commission, Docket No. 060614-TC, Compliance investigation of TCG Public Communications, Inc. for apparent violation of Section 364.183(1), F.S., Access to Company Records and determination of amount and appropriate method for refunding overcharges for collect calls made from inmate pay telephones, dated Sep. 8, 2008.
"Order Accepting Settlement Offer," Docket No. 060614-TC, issued Aug. 31, 2009.
Excerpts from Staff Proposed Agency Action in Florida PSC Docket 060614-TC dated Sep. 8, 2008.

* cited by examiner

*Primary Examiner* — Rasha Al Aubaidi
(74) *Attorney, Agent, or Firm* — Kilpatrick Townsend & Stockton LLP

(57) ABSTRACT

Tthe present invention seeks to avoid origination or continuation of unauthorized calls, while also avoiding the inconvenience, expense and uncertainty for call parties resulting from premature termination of calls because of erroneous or ill-founded suspicions that unauthorized activities are occurring. By permitting one or more parties to a call that is deemed suspicious to provide information establishing proper authorization, or innocent mistake, security procedures can be assured while avoiding improper false-positive determinations that unauthorized calling activities have occurred. When suspicions cannot be overcome, the called party is requested to terminate the call and a separate continuation link is established to the called party.

21 Claims, 4 Drawing Sheets

METHOD AND APPARATUS FOR TREATING POTENTIALLY UNAUTHORIZED CALLS

RELATED APPLICATIONS

The present non-provisional application is related to Provisional Application No. 61/065,991 filed Feb. 15, 2008 and claims priority based on such Provisional Application. The present application hereby incorporates by reference Provisional Application No. 61/065,991 as if set forth in its entirety herein.

FIELD OF THE INVENTION

The present invention relates to telecommunication systems, and more particularly to methods and systems for monitoring voice calls for unauthorized activities. More particularly, the present invention relates to such methods and systems for identifying potentially unauthorized voice calls originating in a call-restrictive calling environment, such as a jail. Still more particularly, the present invention seeks to avoid origination or continuation of unauthorized calls, while also avoiding the inconvenience, expense and uncertainty for call parties resulting from premature termination of calls because of erroneous or ill-founded suspicions that unauthorized activities are occurring. By permitting one or more parties to a call that is deemed suspicious to provide information establishing proper authorization, or innocent mistake, security procedures can be assured while avoiding improper false-positive determinations that unauthorized calling activities have occurred.

BACKGROUND OF THE INVENTION

Telephone calls made by inmates in jails, prisons and other confinement institutions are usually processed using so-called Inmate Calling Services (ICSs). A provider of such services may also be called an Inmate Calling Service, but will here be distinguished, when necessary, by using the term ICS provider. An ICS provider typically employs a variety of processors, databases and other equipment elements individually well known in the art in a system (here referred to as an ICS System or ICS infrastructure) to perform the many functions involved in ICSs. Particular functions, such as call control, three-way call treatment (discussed below) and many others are typically configured and performed under stored program control of such ICS systems.

Institutional regulations typically limit calls from an inmate in terms of call duration, frequency and call destinations for which calls are authorized. Often, a list or computer database is consulted in response to a call request made by an inmate to determine whether the requested call is to an authorized called destination. Such databases provide a called number validation or screening to prevent harassing calls from being made to law enforcement or other government officials, for example, or to seek to prevent conversations relating to criminal activity. In some cases potential called parties indicate that they do not wish to receive calls from a category of callers, such as all callers, or one or more individuals at a particular confinement facility.

Modern technology has provided ample means for inmates and their accomplices to seek to circumvent call destination (called number) limitations. Thus, for example, so-called three-way (3-way) calls may be attempted by seeking to bridge (or conference) an existing (2-way) first call that has been completed from an inmate to an otherwise authorized called party. This second call is placed by or on behalf of the authorized first called party to an unauthorized second called party. In particular cases, the first called party may retain a presence on these bridged first and second calls, or the first called party may hang up the first call after the second called party answers. In the latter case, the call from the inmate will effectively have been forwarded to the second (unauthorized) called party.

Different versions of authorized and encouraged bridging or conferencing of telephone calls are offered by local and long distance telephone companies to provide their subscribers with a rich array of calling services. However, such bridging can be misused when an ICS call to an authorized (first) called party is bridged to another unauthorized (second) called party. For example, bridging may be accomplished by the first called party using a second telephone line at the station set of that first called party to reach (and bridge or conference) the unauthorized second called party. The terms bridge and conference will be used interchangeably in this application unless a distinction is required by a particular context. Some practitioners in the telecommunications arts seek to distinguish extending a call to a third party solely through a telephone company central office, or the equivalent, from a bridge established at a (first) called party station. Call forwarding likewise has several different implementations, some of which involve behavior, such as keying in a prefix (such as 72 #) followed by the forwarded-to number. Moreover, such activation of call forwarding on a telephone line (associated with a subscriber number or account) can often be performed remotely from anywhere a standard dual-tone multi-frequency (DTMF) telephone set can be used to place a call to the telephone company providing such remote call forwarding service. For simplicity in the sequel, all calls involving bridging, conferencing or forwarding of calls to unauthorized parties will be referred to as unauthorized 3-way calls, or simply 3-way calls if no authorization for 3-way calls exists for the relevant context. Similarly, the actions seeking to establish or maintain such calls will be referred to as 3-way call attempts or 3-way calling. It should be understood that a conference, authorized or not, can be sought to be established between more than three parties. Such conference calls will nevertheless be referred to as 3-way calls, unless the context requires that a distinction be made.

ICS providers use specialized call handling equipment to process a request for a call by an inmate to a (first) called party identified by the inmate by temporarily connecting the inmate calling party to ICS infrastructure equipment—effectively placing the inmate calling party on hold. This on-hold condition persists until the conditions (regarding allowability of called parties and validation of numbers to be called, among others) imposed by the institution or the ICS service provider are satisfied and the called party is available to be connected (bridged) with a connection from the ICS infrastructure to the called party. Unauthorized 3-way calls described above are to be distinguished from calls from a calling inmate that are bridged to a call to an authorized first called party and another authorized party. Such authorized 3-way calls may, e.g., include an ICS call to an authorized (first) called party that also includes a bridged call to an authorized attorney. Such authorized 3-way calls are sometimes erroneously identified as unauthorized 3-way calls because of call party errors or because of ICS infrastructure limitations.

Since most calls by inmates using an ICS are collect calls, assent of the called party to accept charges for the call is usually indicated by using keyed DTMF signals. For example, a number, such as 3, is commonly keyed by a called party in response to a voice announcement from the ICS system seeking willingness of a called party to accept and pay for a call received from an inmate. In practice, such voice prompts are played when a called party answers a call from an inmate, but before the inmate is bridged to the connection to the authorized called party. Such voice prompts will typically indicate the nature of the call (a call from a particular jail) and the identification of the calling inmate party, and will typically require that the called party depress one or more identified keys on his/her telephone keypad, e.g., "Please press the three key if you agree to accept this call and have this call charged to your telephone account." In particular cases, such as when pre-paid, debit and certain free calls may be included in ICS service offerings, other particular language may be used, e.g., "To accept the charges for this call, press 3." As used in this application, acceptance of the call should be understood to include agreement to pay for the call, unless otherwise stated. Generally, if such acceptance is not received in due course by the ICS provider, the call will be terminated. Alternatively, the voice prompt will be repeated, other voice prompts will be delivered to the called party, or other communication will ensue between the ICS provider and the called party until acceptance is received or the call is terminated.

When the called party accepts an incoming ICS collect call to be charged to his/her account, the connection from the calling inmate to ICS infrastructure is bridged to the connection from the ICS infrastructure to the called party. In typical practice, ICS equipment will record, and a confinement officer or another on behalf of the confinement institution will selectively monitor some or all of: call requests by inmates, voice announcements and prompt(s) from the ICS provider to an authorized called party, called party responses (including DTMF signals received by the ICS provider that signal acceptance of the call). As well, as the telephone conversation between the calling inmate and the called party that occurs after acceptance by the called party will typically be monitored and/or recorded. Of course, any subsequent bridging or forwarding of connections to include the inmate calling party and other than the original called party (and the inmate calling party) will typically be monitored and/or recorded.

Certain signal conditions typically appear on a telephone connection during an attempt by the inmate calling party or someone at the original called station seeking to bridge or conference a third party to an existing call completed from an inmate to an authorized called party. Attempts to thwart, or at least detect, unauthorized 3-way calling have therefore tended to focus on detecting signals arising from activities by an authorized called party in making a 3-way call attempt. Thus, in particular, monitoring of line signals during an on-going connection for the presence of so-called hook-flash signals used by some telephone companies in providing conferencing or call forwarding has been employed. In other attempts at 3-way call detection, other particular telephone line signal conditions have been monitored, such as background noise levels, call progress tones, DTMF dialing tones, and others. However, because communications networks are subject to a variable array of noise conditions and other impairments, and because monitoring equipment and software often prove inadequate to their task, and for other reasons, 3-way call detection efforts have proven inaccurate and largely unsatisfactory. Further, it has proven costly in terms of processing resources needed for continued monitoring of an on-going call for any of a large number of signal conditions possibly indicative of 3-way call attempts.

The incidence of false-positive indications of 3-way call attempts has likewise resulted in the inconvenience of unnecessary call terminations and consequent call expenses to billed parties. Many such false positive determinations of unauthorized 3-way calling activity are attributed to inadvertent keying of one or more digits by a party to an otherwise authorized 2-way call, or to crosstalk of signals from other lines or trunks in the telecommunications plant. Still other false determinations of 3-way calling activity are attributed to a called party subscribing to a call waiting feature that causes a tone to appear on an on-going conversation when an incoming call arrives at an authorized called party location. Still other causes for making determinations of 3-way calling made by some ICS providers are ascribed to use by called parties of cordless phones, wireless phones or by static and interference on a telephone line. Such noise can be of a type that is indistinguishable by current 3-way call detection devices and techniques from a hook-flash signal or other signal condition or conditions used for 3-way call determination.

Certain types of 3-way calling provided by telephone companies require that a first called party put the connection from the ICS infrastructure to that first called party in a hold state, therefore giving rise to speech silence over that connection. Unfortunately, silence resulting from this on-hold state is frequently indistinguishable from silence from other causes. Thus, for example, a first called party using a cordless or wireless telephone might experience a temporary drop-out or significant lowering of sound volume that is tantamount to silence on the line. Also, many conversations between an inmate and family or friends may produce emotional or other circumstances giving rise to long periods of silence. Current ICS infrastructure and methods practiced using such infrastructure are often incapable of distinguishing between different kinds of periods of silence or apparent silence. A result of this is that a judgment can readily be made that a 3-way attempt is being made, often resulting in termination of the call.

As will be apparent from the foregoing, most attempts at dealing with unauthorized 3-way calls are made when an actual or suspected 3-way call is being set up. Call termination is a typical response by many ICS providers if uncertainty remains after some line condition or other behavior of the call parties appears suspicious. The cost and inconvenience of false positive findings is obviously considerable, often disproportionately impacting persons of limited financial means.

Since many ICS calls are subject to a so-called per call operator service charge (nonrecurring charge) or similar charge, e.g., a higher rate for an initial period of a call, however short, the billed party experiencing premature call terminations is required to pay consecutive per call operator service charges when additional calls are required because of such premature call terminations. This is the case when such premature termination occurs because of a false positive determination that unauthorized call activity is transpiring. In some documented cases, a large portion of ICS calls have been found to have suffered premature, and oftentimes erroneous, terminations and have been subject to such repeated per call charges. In what many consider an even more serious consequence of false positive determinations of 3-way call attempts, activities deemed to be a 3-way call attempt (or an actual 3-way call completion) are often treated by an ICS provider or institutional management as justification to limit future calling privileges.

Further, there exists a careful, and often controversial, balance that is sought between the interests of law enforcement officials, criminal investigators, authorized called parties, various advocacy groups and ICS providers relative to false positive determinations of 3-way calls. Technology currently deployed in ICS systems can be configured to be more or less sensitive to various line signal conditions. Such sensitivity can be characterized in terms of one or more thresholds for a variety of respective call behaviors and/or line conditions. Alternatively, some composite metric, e.g., a minimum number of detected DTMF digits and certain defined periods of silence, can be phrased as a threshold. For future purposes in this description, such individual and composite thresholds will be collectively referred to as a threshold.

Determination of an appropriate threshold for these conditions is typically made based on a variety of conditions, including type of network infrastructure, call volume, expenses related to staff for monitoring and evaluation, observed conditions and prior experience with particular threshold values. Some are concerned that expediency will dictate that the threshold will be set too low, thereby causing many not-clearly-defined and/or not-clearly-understood behaviors or line conditions to be treated as positive indications of a 3-way attempt—with the result that an excessive number of premature call terminations occur. Others are concerned that the threshold be set too high to detect only the most certain or most egregious behaviors and line conditions, so that the number of positive indications is low. What is needed is a 3-way call attempt detection and prevention process that is fair and reasonable, as viewed by a broad consensus of those concerned. In particular, when there is sufficient uncertainty as to whether an actual 3-way call attempt is or was made, measures should be taken to reduce that uncertainty. When such uncertainty cannot be reduced to an acceptable level, premature termination of the call by an ICS service provider should not be the only option. Also to be considered are the practical limitations of call processing equipment and processes, the lack of familiarity by some users with ICS procedures, and the ingenuity and past behavior of malicious ICS users.

Only when it can be established with sufficient certainty that, under then-prevailing circumstances, an unauthorized 3-way call attempt has been made—or is in the process of being made—should an ICS service provider unilaterally terminate a call. Further, a default result of treatment of potentially suspicious call party behavior or line signal conditions should not cause undue expense or inconvenience for the call parties.

Interactive voice response (IVR) systems have become ubiquitous in modern commerce. Recorded announcement such as "Please press 1 for sales, 2 for service" and the like are the norm when calling many businesses. Such IVR techniques have been adapted for use in ICS systems, primarily for announcing an incoming call to an authorized called party and receiving a called party assent, e.g., in the form a one or more returned DTMF digit tone signals. Because most ICS systems rely to a great degree on IVR, there is often no immediate recourse for a calling or called party to a premature termination of an on-going ICS call, including those that were the result of a false positive 3-way call determination or an arbitrary decision by an ICS provider to terminate the call.

It is therefore desired that systems and methods be provided for avoiding premature termination of ICS calls because of false positive, or other improper or inappropriate determinations of 3-way call attempts or other suspicious behavior. Techniques for more thorough analysis of the state of on-going ICS calls, signal conditions on such calls, and any inputs or other evidence offered by parties to the ICS call are needed to avoid improper charges (including unnecessary additional call costs), suspension of calling privileges, wasted time and effort—all with little or no recourse by parties to the call. It remains essential, of course, that suppression of those calls that have a high likelihood of being actual 3-way call attempts (or completions) be maintained.

SUMMARY OF THE INVENTION

The limitations of the prior art are overcome and a technical advance is made in accordance with the present invention, detailed embodiments of which are presented in the following detailed description.

In accordance with one aspect of illustrative embodiments of the present invention, when unauthorized call activity is suspected in the course of an ICS call (a Call Alert or detected anomaly), the inmate calling party is disconnected from the bridged call and a voice announcement is optionally made to that inmate calling party. This disconnection alone avoids a goal of an unauthorized call or call attempt, viz., it avoids further voice communications between the inmate calling party and an unauthorized called party—if any such unauthorized called party is present.

In accordance with another aspect of illustrative embodiments of the present invention, any determination of whether an attempted (or completed) 3-way call had been underway awaits an evaluation of further evidence. Thus, for example, a determination of unauthorized 3-way call activity need not be made based on a single condition, such as detection of one or more DTMF tone pairs or other particular signals on an on-going ICS call. Rather, one or more IVR announcements are made to the (presumed) authorized original called party, which announcements solicit additional input from that party.

Based on responses to such IVR announcements received by the ICS infrastructure (or lack of any such responses), various evaluations of line signals—including line signals corresponding to responses made by the remaining party(ies) on the link(s) from such remaining party(ies) to the ICS infrastructure. Such responses will include, in appropriate cases, DTMF and/or voice signals—solicited by the ICS infrastructure.

As one example of analysis of solicited inputs, the (presumed) authorized called party will be asked to repeat the key depression sequence (one or more DTMF digits) that was used to accept the call during original call setup. This signal will then be evaluated in comparison with the original call acceptance sequence as the latter was captured at the ICS infrastructure. If the repeated key sequence bears a predetermined (detailed) similarity to the original call acceptance sequence, then there is a heightened likelihood that the original called party is the only call party on the line then connected to the ICS system.

In addition, in appropriate cases, a more detailed analysis of the potentially suspicious call activity giving rise to the call alert may be performed. Thus, for example, a more focused analysis of one or more portions of the recording of the on-going call will be performed. Such analysis of a portion of the recording may identify the presence of unauthorized dialing sequences or identify a call waiting signal that may have been present on the line. Corresponding analyses may be performed for any apparent fading experienced by a cellular or cordless phone surrounding the time of a call alert.

Still further, analyses can be made of voice signals requested by IVR announcements to the presumed called party, including comparison with voice signals appearing on the line at the beginning of the original bridged call. If voice analyses indicate that the voice signals (other than those of the inmate calling party) at the time of the call alert (or received in response to an IVR request) bear a predetermined similarity to those present at the outset of the bridged call, then the likelihood is increased that the called party on the line is the original called party, and therefore is authorized. Comparison with voice signals from past calls between a present inmate calling party and the called party at the time of detection of potentially suspicious activity (i.e., a call alert) may also be performed to further support a no-3-way determination.

When these and/or other such evaluations are performed and insufficient objective bases are found to support a conclusion that unauthorized calling practices were present at the time of the call alert, then the call can be resumed by again bridging the calling and called party. It will prove useful in these resumed circumstances to make an IVR announcement to the rejoined parties on the line.

If there is insufficient information to support an increased likelihood that no unauthorized calling activity was present at the time of the call alert, then the solicitation of DTMF or voice signals and the analyses of them and other signal conditions can be repeated. If, after one or more cycles of announcements and signal analyses sufficient uncertainty remains as to whether unauthorized calling activity or not, then an IVR announcement is illustratively made that makes clear to the called party(ies) on the line that difficulties remain with the call and a request is illustratively made to the called party(ies) to hang up and await a follow-up call that will promptly be made by the ICS system to the original called party.

Inviting the called party(ies) to hang up when uncertainty remains regarding a possible 3-way call attempt provides two useful effects: (i) the called party phone must be hung up so that the follow-up call can be made, and (ii) requesting that the called party perform the action of disconnecting the call is preferable to having the ICS provider apparently arbitrarily terminate the call (as has sometimes been done in the past), thereby vesting a degree of control and choice in the called party.

In accordance with another illustrative aspect of the present invention, an announcement requesting hanging up by the called party includes a statement that the follow-up call will not result in any additional charge beyond those for the period of the call that both parties were able to take part in. This will illustratively be clarified by stating that the call will be resumed with charges beginning only when both parties are again connected, and that there will be no per call operator service charge for the follow-up ("continuation" or "continued") call, only the per minute charges for the continuation call will be added to the charges for the time of the original call before it was interrupted. The parties will be allowed to continue their conversation for whatever period they would otherwise have been allowed to continue, such as the facility allowed talk time.

Upon resuming the original call or beginning the continuation call, monitoring will continue, perhaps with a higher level of attention—depending, e.g, on the detailed results of the analyses performed while the call had been interrupted. If repeated call alerts (detected anomalies) occur, the original called party will illustrively be invited in a further IVR announcement to write a detailed description of events as he/she perceived them for submission via e-mail or for entry in forms available on a website specified by the ICS provider. Alternatively, a toll-free number may be provided to allow a called party to provide comments, e.g., to a customer service representative (CSR), or another organization of the ICS service provider responsible for customer interactions, regarding treatment of call alert events. A call alert number will advantageously be provided to the called party for reference in any further communications with the ICS provider regarding such anomalous call event.

It will be noted that when evidence adduced subsequent to a call alert provides insufficient basis to conclude that unauthorized calling activity has occurred, then, at most, a continuation call results—possibly with increased scrutiny. Further, the continuation call is necessarily made to a party at the original authorized called party phone number. So, even if a 3-way call attempt or other unauthorized calling activity had taken place, the call resumed with the original called destination, not with any third party destination. Moreover, any termination of the call was not arbitrarily made by the ICS provider, but made only after further examination of facts surrounding a call alert—and even then, the termination is typically performed by the called party or with the acquiescence of the called party. In any event, any unauthorized third party will not be present on the continuation call. If a subsequent attempt is made to add an unauthorized third party to the continuation call, the evaluation of suspicious activity will be repeated, albeit with awareness of the preceding call event.

Unless an inmate calling party or a called party (or both) have a history of suspicious activities, and, perhaps, proven unauthorized calling activities, e.g., by voice or other evidence recorded in a call, it may rarely be required that an ICS provider terminate a call for suspicious activities giving rise to a call alert. A called party repeatedly being interrupted and being repeatedly connected by a continuation call will realize that attempts to successfully place a 3-way call or perform other unauthorized calling activity will be unavailing and not worth the effort. Other actions may, of course, be taken by the confinement or other institution upon a showing that repeated call alerts have been uncovered, and that documented processing seeking to clarify the nature of the call alert has been pursued. It is likely that any unintended actions consistent with seeking to make a 3-way call or to perform other unauthorized calling actions will be found upon processing of the type described briefly above. Further, when a called party is found to be repeatedly involved in reasonably suspected or actual unauthorized ICS call activities, that called party will typically be required to explain to a CSR of the ICS service provider why he/she should not be barred (at least for some appropriate period) from receiving future calls from an ICS inmate calling party.

Additional steps are advantageously taken to connect an authorized third party to an ICS call in such manner as to distinguish the authorized nature of that link from one including an unauthorized third party.

BRIEF DESCRIPTION OF THE DRAWING

These and other advantages of illustrative embodiments of the present invention will be apparent to those skilled in the art by reference to the following detailed description and the accompanying drawing figures, in which.

DETAILED DESCRIPTION

Figure 1:
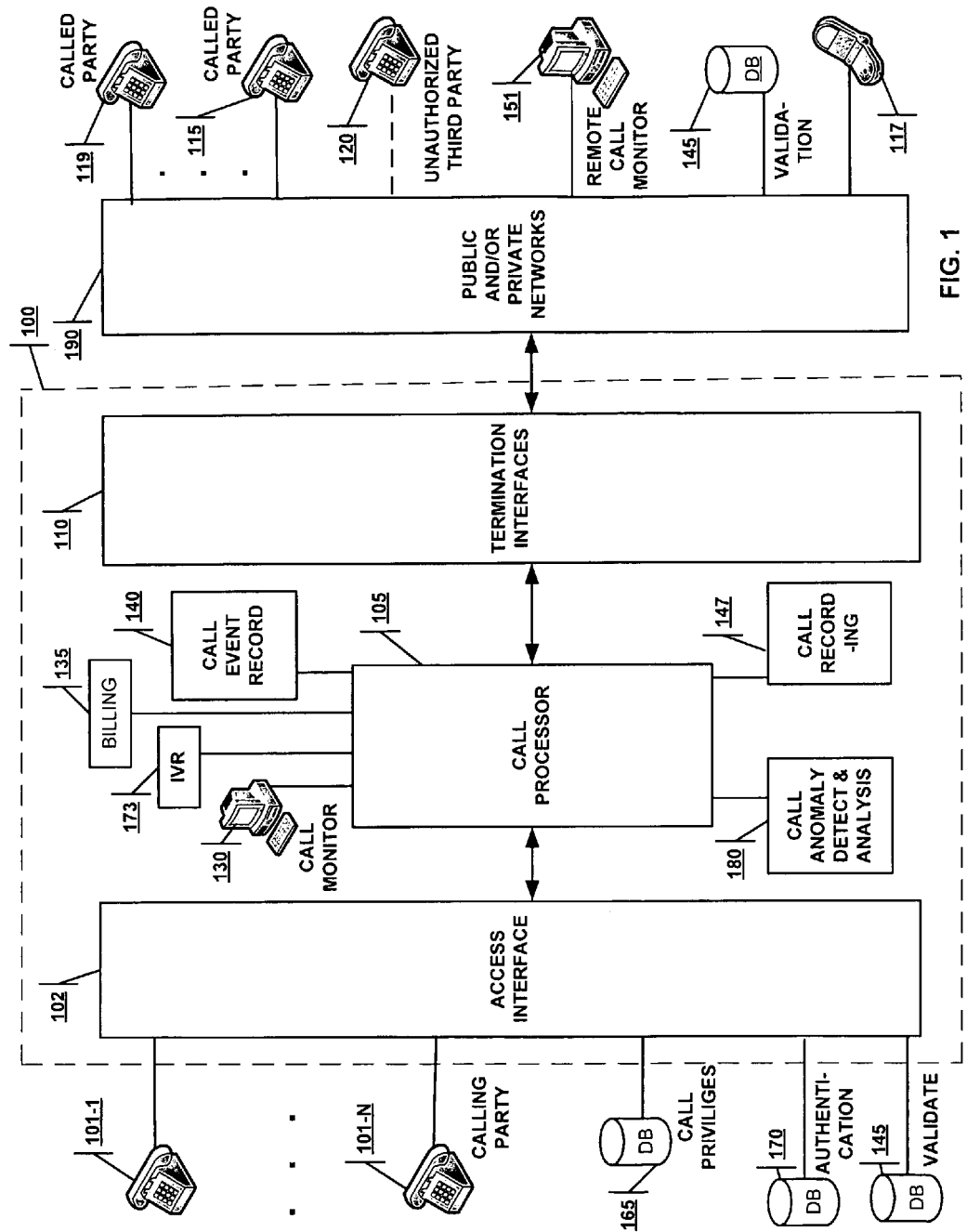
FIG. 1 shows an overall network configuration for practicing illustrative embodiments of the present invention.

FIG. 1 shows an overall network configuration for practicing illustrative embodiments of the present invention.

As shown in FIG. 1, a plurality of telephones 101-$i$, $i=1, \ldots, N$ are shown connected to an access interface 102 within ICS System 100. The telephones 101-$i$ are illustratively within and under the control of a confinement institution and its officials. ICS system 100 is designed, configured and programmed to enable the placing of telephone calls to any authorized telephone station, e.g., 115, 117 and 119, over the Public Switched Telephone Network (PSTN), a packet data network for carrying Voice over Internet Protocol (VoIP) voice packets or any of a variety of wireless or mobile networks. Telephone 117 represents cellular or other mobile telephony devices to which calls can be sent using a variety of mobile network infrastructures. Telephone 117 will, in appropriate cases include so-called smartphones as well as any voice-enabled Mobile Internet Devices (MIDs), such as those incorporating Intel's Centrino Atom processors. In general devices represented by telephone 117 will include devices capable of executing program applications created or downloaded over a data network by device users. Telephones 101-$i$ can be of any kind suitable for use at a confinement or similar facility, and therefore include, in general, both analog telephone instruments and IP telephones, all of well-known design. Telephones 119 may also be wireless or cordless terminals with the wide variety of features currently available.

ICS system 100 is shown as including a number of functional units, each of which is either well known or will be described below. In particular, ICS system 100 includes an access interface portion 102, a call processor 105 and a termination interface 110. As implied by their names interfaces 102 and 110 function to connect or interface to other elements, including elements that are within or outside of ICS system 100. In the case of access interface 102, functionality is provided to allow illustrative telephones 101-$i$, $i=1, \ldots, N$ or other authorized station equipment to access the resources of ICS system 100.

Similarly, termination interfaces unit 110 represents terminations to public and/or private networks, including, among others, the PSTN (or other connection-oriented networks) and packet networks using any of a variety of well-known communications protocols. These networks of whatever kind will typically include packet networks, including the Internet and other networks using the Internet Protocol (IP) and other protocols associated with packet networks.

Also shown in FIG. 1 connected to ICS system 100 through PSTN 110 is a representative unauthorized telephone station 120. Stations like 120 are those that have not been authorized by the confinement institution as stations to which particular inmates (or all inmates) may place telephone calls. Representative mobile telephone station 117 is connected to ICS system 100 through one or more mobile telephone networks including mobile telephone control and interconnection facilities such as Mobile Telephone Switching Offices (MTSOs), Such mobile stations may or may not be authorized (by confinement officials or ICS service providers) to receive calls.

ICS System 100 is also shown connected to an authentication database 170 that contains information that can be used to verify identification information supplied by an inmate calling party (typically an inmate at one of the phones 101-$i$). Such information may include one or more of a Personal Identification Number (PIN) that can be keyed at the telephone station 101-$i$, or other uniquely associated indicia. Words spoken by a caller over a phone 101-$i$ can be used for authentication by comparison with speech samples stored in database 170, or a Radio Frequency Identification RFID tag can be used to authenticate the caller. Of course, many other authentication devices and procedures may be used to meet particular requirements. Database 170, is shown as a separate unit external to ICS system 100, e.g., linked to ICS system 100 by a local area network LAN or any other network. Alternatively, database 170 may be fully integrated into ICS system 100, as may be determined based, e.g., on the required scale of operations at the database, and on other resources available in its operating environment.

Also shown connected through access interface 102 in FIG. 1 is a call privileges database 165. Database 165 is conveniently used to store information regarding the privileges to be accorded each inmate caller. Thus, for example, a list of allowed called party numbers (e.g., those of family or attorney) is advantageously associated with each inmate caller. A Do Not Call indicator may also be provided in call privileges database 165 to indicate numbers to which calls should not be made, either because of the identity of a party associated with that number (e.g., a public official, or a victim of a crime), because the would-be called party has expressed a desire that calls from particular inmates (or all inmates) at a confinement facility not be received, or for other reasons. In the course of setting up a call for an calling party at the confinement institution, the ICS system can routinely check with the database to see if the requested call is allowed or not; if not, the inmate calling party will be notified that the call cannot be completed.

Additionally, the call privileges database conveniently stores information relating to special calls, e.g., allowed 3-way calls that are configured by adding an allowed third party, e.g., a specific attorney, to an existing normal (2-party) call to a family member or the like. Advantageously, such allowed 3-way calls will, in accordance with an aspect of the present invention, be set up by the ICS service provider as a separate call to the allowed third party that is then bridged to an existing two-way call. Related processes were described in U.S. patent application Ser. No. 11/219,541, filed Sep. 2, 2005, which application is hereby incorporated by reference in this application. These special call arrangements and related procedures will be discussed further below in connection with the handling of potential unauthorized 3-way calls.

Another database shown in FIG. 1 is representative validation database 145 shown connected to one or more of the public and/or private networks indicated by reference 145 in FIG. 1. Database 145 represents data resources queried by ICS system 100 to validate the telephone station number provided by an inmate calling party. Through such validation evidence is gathered as to the existence of the presented number and information as to how billing may be made to recover charges for providing the ICS services requested. Typically, the validation database will include a Line Identification Database (LIDB) provided by Local Exchange Carriers or other validation service providers. These validation services are typically provided as query and response exchanges with the query including a subject phone number and the response providing information to be evaluated by an ICS provider in deciding whether to allow a particular call. The kinds of information sought during validation can vary with circumstances, but such data as current (or other) account balances, billed number screening (BRN), existence of conferencing or call-forwarding features at an identified number are known in the industry and may prove helpful in deciding to allow an identified number to be used as a called party number for an ICS call.

FIG. 1 also shows call processor 105, which processor may include a general purpose computer configured and programmed to be adapted to control the various functions associated with ICS system 100. In particular, call processor 105 is adapted to receive caller requests for linking stations 101-*i* to one (and sometimes more than one) of the representative stations 115, 117 and 119 and to enforce policies seeking to prevent unauthorized third party calls to representative station 120. In identifying various stations as representative, it should be understood that these stations are representative of a potentially large class of stations of similar or related kind. As described above, and as is well-known for ICS systems generally, this linking is accomplished by having a first link from the inmate calling party to the ICS infrastructure (including call processor 105) and a second link from the ICS infrastructure to an allowed called party bridged. Such bridging advantageously is performed in call processor 105 or any of several kinds of switch networks associated with processor 105.

Additionally, ICS system 100 includes call recording unit 147 for recording calls placed by callers at terminals 101-*i*. Such recording is well known in the ICS field and is described, for example, in co-pending U.S. patent application Ser. No. 11/219,560 filed Sep. 2, 2005, which application is hereby incorporated by reference as if set forth in its entirety herein. It proves advantageous in connection with the present invention to have a separate recording associated with each call placed, or sought to be placed, by an inmate caller. Such recording is typically started when the inmate caller goes off-hook and before providing required authentication information. In many cases, the first activity recorded is an IVR announcement soliciting a language preference, e.g., "Press 1 for English, 2 for Spanish, . . . ." The recording for a particular call ends when the last party to the call hangs up or a timeout condition occurs after one party hangs up. As will be seen from the description below, aspects of the current invention permit a called party to hang up in anticipation of receiving a continuation call; in these cases the inmate calling party will illustratively remain off-hook until the continuation call has been accepted by the called party and the continuation call is bridged to the link from the inmate caller to the ICS infrastructure. Thus, a single recording will be made of the first call, any continuation calls and all intervening period between the first call and such continuation calls. If the calling party hangs up under any circumstances, the call and the associated recording will be terminated.

Also shown in FIG. 1 is IVR unit 173 for generating voice announcements from the ICS system 100 under control of call processor 105. Such IVR systems are well known in the art.

Call Monitor 130 receives information from call processor 105 regarding aspects of calls being processed in the ICS system 100. In particular, playback of call recordings made by call recording unit 145 are made available at call monitor 130 along with any special attention information developed in call processor 105 and its adjuncts, as described further below. This special attention information advantageously includes flagging of particular calls that may be of interest to confinement facility management, including those that reflect certain behavior or line conditions that have been detected that indicate an attempted 3-way call, for example.

Billing unit 135 is arranged to receive call information from the processor in the form of billing records containing the particulars of calls processed. Thus, the inmate calling party, date, start time, end time, duration, acceptance indication by the called party, type of call and other information are provided to the billing unit 135. Different particular information will be supplied to billing unit 135 as required by local practice in particular facilities. In addition, certain additional information relating to aspects of the present invention will be logged by the system and provided to the billing unit for adjustment of charges for a call, if necessitated by the particulars of the call. This will be described further below in connection with treatment of potentially suspicious calling behavior or line conditions.

Examples of one or more of the above-noted system elements are well known in the art or are described in pending U.S. patent application Ser. No. 11/219,564 filed Sep. 2, 2005, which application is hereby incorporated by reference herein. In particular cases, aspects and features of processor 105 and its adjuncts shown in FIG. 1 can be implemented using the well-known Asterisk® IP-PBX software, which is presently available free of charge by Internet download and use on a variety of hardware platforms under a General Public License from Asterisk.org. One or more other or different general and/or special purpose processors and appropriate programs will likewise prove useful in implementing various of the features described herein, all as will be recognized to be within the skill of those skilled in the relevant arts.

Call Event Record unit 140 maintains a record for each call of any of several kinds of call events, including potentially suspicious call party behaviors or detected line conditions (collectively call anomalies) detected by call processor 105 and any adjuncts that may be employed. It proves convenient to use a billing record number (discussed below) or any other convenient call identifier to identify the source of call events and to permit extraction and correlation of potentially diverse events, including call anomalies, with a call. In some environments, call anomalies will be accumulated separately, but will still be identified with a particular call. Examples of call anomalies are one or more DTMF digits detected at a time in a call when such digits do not ordinarily occur, and unexplained extended silences. Such extended silences are those in excess of a duration selected by an ICS service provider based on prior experience, and/or in furtherance of confinement facility policies. Other call anomalies can relate to detected noise levels (including signal spikes), or other Quality of Service (QoS) conditions of an unusual or objectionable nature. When present contemporaneously with (or without) speech silence, keyed DTMF digits, ringing, dial tone, special information tones (SITs) or other particular signal conditions, or QoS condition information, noise or other environmental conditions (or combinations of these conditions) can often can be anomalies that will inform a decision regarding possible intent to attempt or complete a 3-way call.

One particular adjunct processor unit or adjunct that call processor 105 will employ in particular cases is one based on systems and methods described in U.S. provisional patent application 60/927,645 filed May 4, 2007, which provisional application is hereby incorporated by reference as if set out in its entirety herein. In this provisional application techniques are described that seek to verify that an on-going ICS call that has been accepted by a particular called party by keying a prescribed digit, e.g., a keyed 3 digit, continues to be connected to that called party. Then, by comparing signal characteristics of a second occurrence of the signal characteristics of a previously keyed acceptance digit with the original keyed acceptance digit (not the digit significance, i.e., not just comparing two "3" digits, but rather comparing the frequency, phase, group delay and other such signal characteristics), evidence is adduced as to whether a third party has been substituted for (or has joined) the original called party on a call.

Other verification techniques are also described in the last-cited provisional application; these techniques can employ digit sequences as well as single digits, as just noted. In FIG. 1 the functions of detecting and analyzing call anomalies are performed in call anomaly detect and analysis unit 180. These functions will be described further below.

Anomaly Detection and Analysis

Figure 2:
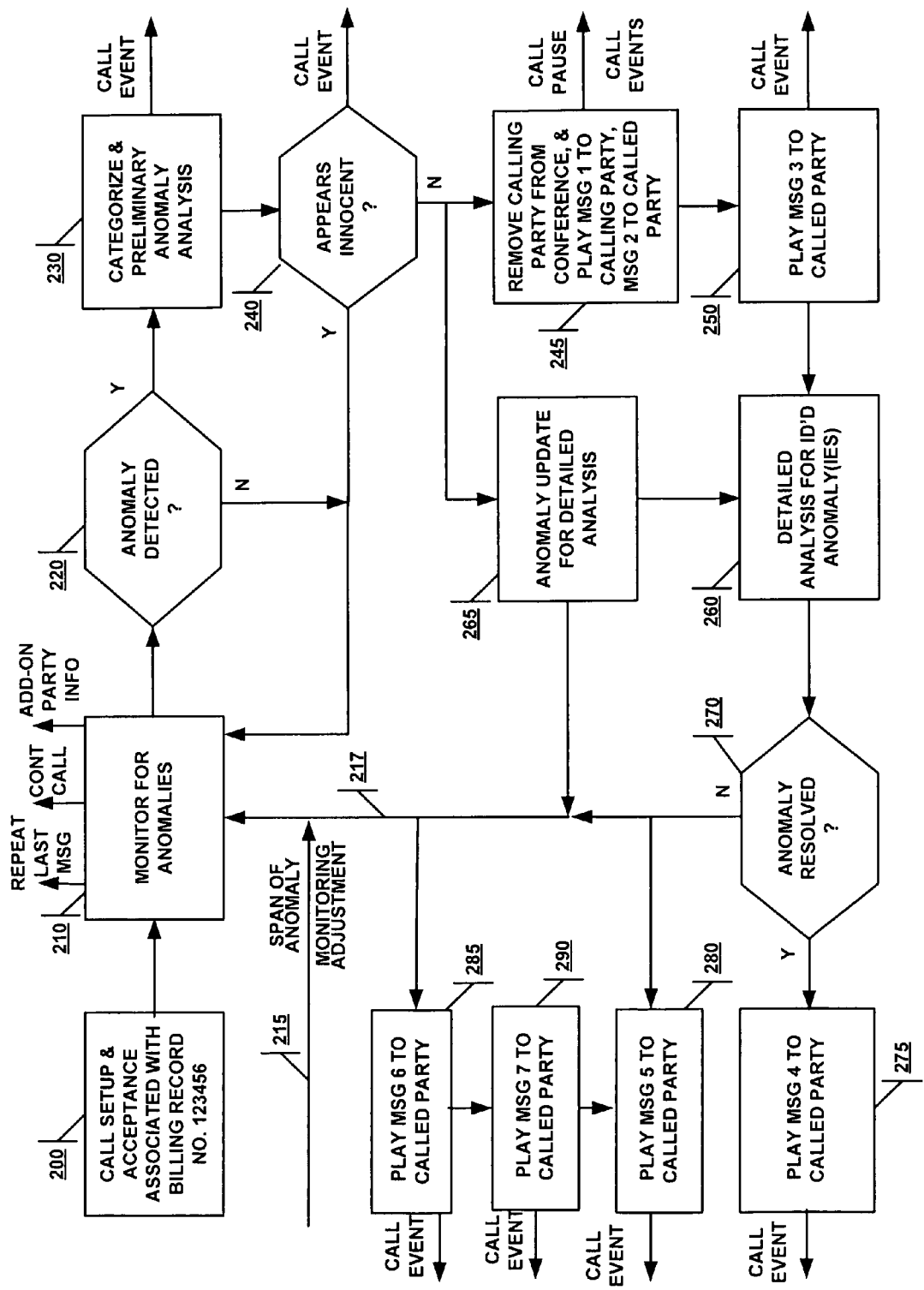
FIG. 2 is a flowchart illustrating overall operation of processing features applied to potential unauthorized 3-way call attempts (call alerts or detected anomalies) in accordance with illustrative embodiments of the present invention.

FIG. 2 is a flowchart showing illustrative overall operation of processing features for detecting and analyzing signals associated with potential 3-way call attempts in accordance with illustrative embodiments of the present invention.

In FIG. 2 Step 200 summarizes call setup, acceptance and creation of a billing record in accordance with illustrative embodiments of the present invention. Step 210 represents actual monitoring for signal anomalies for on-going calls in such illustrative embodiments. Generally, facilities and methods or processes for such monitoring are applied to user behavior, e.g, expected behavior of call parties in response to IVR prompts (or failure to respond appropriately), and to signals appearing on the call talking path and on any signaling or other path, medium or link associated with a call that may be available at the ICS system. Other inmate calling party behavior will include hang-up by either the calling or called party.

The terms signal or signals should be understood to include signals of any kind; such signals may be periodic, continuous, sporadic, random, bursty or having any temporal sequence or arrangement, and may be analog or digital, coded or uncoded, modulated or not, packetized or not, naturally occurring or not, caused by parties to a call or not, and include any part, component, field, pattern or sequence of these types, and signals may be of any format or representation, in any media, and may be electrical, electromagnetic, acoustic, optical or any combination of these. Illustrative examples of signals appearing on the talking path include speech (including recorded or synthesized speech), tones (including DTMF tones), silence (meaning speech silence, i.e., the absence of speech, unless otherwise noted), noise of any form or type, and other audio signals, whether consistent with speech, signaling or tones.

Step 200 shows an ongoing call with a sample billing record number (BRN) of 123456 that is used to identify a call and events that occur during the call. Such BRNs will typically be assigned sequentially as calls are received at the ICS. In particular, it proves convenient to assign a BRN at the time the call request is received, i.e., at the time an calling party goes off-hook in preparation for providing inmate calling party authentication information, called party number and any other information required by the ICS service provider or the institution for security, record integrity or other purposes. In some embodiments, it may prove useful to employ a different common identifier for call events and billing. Thus, for example, it may prove convenient in some cases to employ an identifier based, at least in part, on a called party number, though the following description will adhere to the BRN. Upon assigning a BRN it proves advantageous to begin recording call events using call recording unit 147 shown in FIG. 1. Timing for a call will typically begin when the BRN is assigned, but charging for the call will generally begin when a called party accepts the call and agrees to be responsible for call charges.

A call may be terminated by the ICS infrastructure at any time and, for purposes of the present narrative, will in any event be terminated by a hang-up by the inmate calling party. If an inmate calling party hangs up and immediately thereafter goes off-hook (in preparation for another call or otherwise), a new BRN will be assigned. A billing record associated with a particular BRN will be used to derive charges for a call and, in some cases other purposes, such as tracking a recorded call at call monitors, including 130 or 151 in FIG. 1. The call event record unit shown as 140 in FIG. 1 will illustratively use a BRN for a particular call to associate call events of significance that occur during that particular call.

As will be described below, embodiments of the present invention may employ one or more so-called call pauses (or simply pauses) in the course of seeking to resolve the significance of one or more call anomalies that may be detected during an ICS call. Illustratively, time that elapses during such call pauses will not be charged, and if a hang-up by a called party occurs during a call in anticipation of the ICS infrastructure initiating a continuation call, such continuation call, if actually completed, will optionally be considered part of, and will be associated with the same BRN as was associated with the call in which such called party has hung up. This association of call events for a paused call proves advantageous not only in billing but also in identifying actions taken by the ICS system and behavior by parties to the call, including responses to IVR announcements or prompts provided by the ICS system. In appropriate cases, however, it may prove desirable to provide a separate BRN for each continuation call, with linking information being employed to ensure the proper association of the one or more continuation calls with the original call.

Turning again to FIG. 2, it will be noted that at step 210 the ICS system employs so-called span of anomaly monitoring adjustment signals (referred to hereinafter as SAMAS). SAMAS may be received on input 215 from call privileges database 165 shown in FIG. 1, where history of prior calling behavior by particular calling parties will advantageously be stored. That is, if an inmate calling party has a prior history of his/her called parties having engaged in actual, attempted or suspected 3-way calling, then database 165 will advantageously provide data to reflect this history. Monitoring Step 210 will optionally use this call history to inform its monitoring activities. That is, though most call monitoring will be subject to a default set of signals to be monitored, or level of analysis to be performed, those callers associated with certain historical behavior indicating a predilection to participate in 3-way calling may have an increased span of surveillance because SAMAS inputs so specify.

Other SAMAS input information may be provided during or after anomaly analysis of a particular call, as indicated by inputs to Step 210 by updated anomaly information or failure to resolve a particular detected anomaly from Steps 265 and 270, respectively. Thus, if a call anomaly is under investigation of a first detected DTMF signal at a time when none is expected, then Step 265 will update the analysis of the first detected anomaly in Step 260 by any additional information of additional detected anomalies, and may also provide such information as SAMAS information to sharpen up detection of other additional anomalies. Likewise, when an analysis fails to resolve an anomaly at Step 270, processing at step 210 can again be modified—perhaps in a continuation call effectuated using a message (indicated as msg 3) at Step 275. It will be recognized that SAMAS information will in appropriate cases include threshold information of the types otherwise described herein.

Returning to step 210, any prescribed anomalies detected during monitoring at Step 210 will be identified at Step 220 and provided to step 230 for categorization and preliminary anomaly analysis at Step 230. If no anomalies are detected during a given period, Step 220 merely provides a repeat function as indicated by the N (no) output at Step 220.

Step 230 in FIG. 2 anomaly indications forwarded to it will be identified as falling within a particular category, e.g., a detected DTMF tone or a speech silence extending beyond a duration specified by a threshold. Then, a preliminary analysis will be performed to determine whether a DTMF tone, for example, represented a single digit and was most likely the result of an inadvertent key depression by a call party. This may be considered to be a reasonable determination if only one or two keyed digits are detected. Such decision criteria are selectable by the ICS provider or institutional management and applied as indicated above. As will be appreciated, such apparently innocent anomalies may ultimately be disregarded, or, if after further analysis described below, may result in a continuation call. Assuming one or more DTMF digits is determined to be innocent at Step 240, the call is not paused, but monitoring goes forward at Step 210. There are, of course, any number of call behaviors or signal conditions that, taken alone, can be considered innocent. Recognizing this, and avoiding having a call terminated prematurely is advantageously employed by embodiments of the present invention.

In some cases, it will be determined that at least a preliminary analysis should be performed. Thus if a protracted speech silence period is detected as an anomaly, then an analysis at Step 230 will, depending on circumstances, include a brief review of the recorded history of the call. That is, the recording of the present call may be quickly reviewed by accessing call recording unit 145 shown in FIG. 1. A review of the most recent thirty seconds (or whatever period is determined to be an anomalous period of speech silence) is advantageously maintained in a buffer or other storage segment for which audio characteristics of line signals for the subject period are maintained. The review of the storage segment are advantageously reviewed in much faster than real time, using windowed intervals for which audio signals are analyzed and summarized, or using on-the-fly analysis using standard digital signal processing facilities maintained in call recording store 147.

In appropriate cases, the actual audio content for a preceding time interval may be examined and found to include other signals which, in combination with a period of silence might give rise to suspicions that a 3-way call attempt was made or is in progress. In such cases, it may be determined that the detected anomaly is not clearly innocent, thus requiring a more detailed analysis. Such a determination can be further informed by the call history, either of the inmate calling party or the called party, by prior detected anomalies that were deemed innocent when taken alone, but which, in combination with current detected anomalies constitutes a level of suspicion that requires further analysis.

It should be noted that only when the complete (or nearly complete) set of anomalies associated with a 3-way call attempt are found on a particular call can a certain inference be arrived at that these anomalies constitute a 3-way call attempt (or an actual 3-way call setup). This logic is at variance with prior 3-way call attempt analysis because the prior art techniques assumed that there was some danger that a 3-way call could be completed with a reasonable degree of certainty. In accordance with embodiments of the present invention, such likelihood is virtually non-existent. As will be seen below, a continuation call, if completed, is always made to an already approved called destination, so it cannot be a 3-way call. And, the ICS service provider can determine the conditions under which a continuation call will be offered as a condition for allowing an ICS call to be made. This process will now be described in greater detail.

When ICS system 100 cannot immediately determine that a detected anomaly is innocent, Step 245 in FIG. 2 is executed. There, before any further possibly fraudulent activity occurs, the inmate calling party is removed from the bridge that combines the inmate caller-to-ICS and ICS-to-called party calls in a conference. This alone ensures that any 3-way call activity that may be underway is stopped. Without the inmate calling party connected to a call, the purpose of 3-way calling is thwarted. The called party and any non-ICS calling party presumably could share a call under normal calling procedures. It proves advantageous to inform the ICS inmate calling party that the call is being paused (interrupted) until issues relating to signal conditions on the call can be resolved. It is important that if the inmate calling party wishes to continue the current call that he/she not hang up until explicitly notified by the ICS system. IVR Message 1 (MSG 1 in Step 245 of FIG. 2) informs the inmate calling party of these matters. It is also made clear in this MSG1 that there will be no call charge for the period during which the call is paused and that attempts will be made to continue the call in due course. Again, the inmate calling party is advised not to hang up.

In accordance with illustrative embodiments of the present invention, the called party is not disconnected from the present call. Instead, he/she is advised at Step 245 (IVR MSG 2) that there are issues regarding line signal conditions that must be resolved. As with the IVR message to the inmate calling party, the called party is informed that there will be no call charges for the period during which the signal conditions are being reviewed, and that every reasonable effort will be made to continue the call. In accordance with some illustrative embodiments of the present invention, the called party is also requested at Step 250 (in IVR MSG 3) to help resolve these issues by again pressing the digit (typically a "3," though other single digits or digit sequences can be used) that was used to originally accept the call and signal agreement to pay for the call. If this request is not complied with, MSG 3 is repeated one or more times. If, after repeated tries, this request is not complied with, another IVR message is sent to the called party advising the called party that the call will be terminated in some short time (illustratively, ten seconds), unless the response is made. This message will typically repeat the prior announcement that charges will be incurred only for the time prior to the time the call was paused. Illustratively, a toll-free number will be provided that may be called to speak with a customer service representative regarding the call. After the ICS-to-called party link is terminated (or if the called party has hung up) the inmate calling party will be notified that the call has been terminated because the called party failed to respond to a request for input. The called party will then be advised to hang up. Each of these events will be recorded and used to inform any future treatment of calls between the same calling and called parties.

If, when a request is made at Step 250 for the called party to key the same digit, e.g., a "3" key, (or digit sequence) as was used to accept the original call, the called party complies with the request by keying the requested input, then this input will be captured and be subject to analysis at step 260. In one embodiment of the present invention, the analysis to be accomplished will be one of the comparisons and/or other processes described in the above-incorporated U.S. provisional patent application 60/927,645 filed May 4, 2007. If the results of such processing indicate that the two occurrences of the acceptance digit are within a predetermined degree of similarity then it can be presumed that the party keying in the acceptance digit in response to MSG 3 at Step 250 is at the same location as that from which the same digit that had been used to accept the call originally.

Since the link to the inmate calling party has been at least temporarily broken, the results analyses at Step 260 will only include monitored anomalies from the connection including the called party (and, possibly, an unknown third party). However the presence of any such third party is likely, at least in some cases, to influence the signal received by the ICS system for analysis at Step 260. In particular, continued monitoring after disconnecting the inmate calling party might well indicate modified signal conditions compared with those existing at the time of call acceptance. Such modifications are in the form of updates to analysis Step 260 provided by way of anomaly update Step 265, which are also provided as SAMAS inputs to help provide any useful adjustments to the monitoring process at Step 210.

Other particular tests performed at Step 260 will be used in particular circumstances to establish that the party appearing as the called party presently on the call is at the same station terminal as the party that originally accepted the call. While this result will generally indicate that no third party has been added to the call, other facts, e.g., updated monitoring inputs, may indicate otherwise. In any event, the test made at Step 270 will yield a Yes result when the test at 260 produces a sufficiently firm decision to resolve questions regarding the detected suspicious behaviors and signal conditions. A No result will be provided at Step 270 when the results are inconclusive or cannot support any finding of innocence.

Then, depending on the results at Step 270, which may, in appropriate cases be further informed based on history of calls between the calling and called parties, cause either MSG 4 (Step 275) or MSG 5 (Step 280) to be delivered to the called party. MSG 4 will indicate that the signal condition issues have been resolved and the call will continue immediately. In this case the called party will be again bridged to the call from the ICS to the called party and the conference will go on. A call event will be recorded to note when the bridge was resumed, i.e., the pause completed. This information is advantageously made available to billing unit 135 in FIG. 1 to define the period for which charges are applicable, typically excluding time elapsed while the conference was paused. Illustrative functions associated with some uses of MSG 5 in embodiments of MSG 5 will include:

i. Repeat process 3 times before stopping.
 ii. After third time, go to MSG 6.
 iii. Or after first, second or third attempt, move to call continuation option where customer must request reconnection not just hang up to get call continuation.

After the appropriate number of failed attempts per appropriate number of hours, block inmate PIN (if available), or block calls to the called party number then: Provide message to the inmate and either permit no calls to the called party, or call called party and give message.

MSG 5 will indicate to the called party that line signal conditions have not been resolved, but that if the called party hangs up, a continuation call will be placed to the called party, which, after acceptance by the called party, will be again bridged to the inmate calling party in a conference call to allow the call to proceed as it was before the call pause. Again, it will be emphasized in MSG 5 that no additional cost will be imposed for any time that has passed during the call pause, and no additional operator service charges will be due.

For either case (MSG 4 or MSG 5) the call will continue to be monitored when restored, and results of analyses of detected anomalies taken into account on any subsequent call anomaly detection.

The above-described process for treating calls in which anomalies are detected, beginning with Steps 210 and 220 and ending with the playing of announcements at Steps 280 or 275 may be repeated some number of times, N, where N will illustratively have a default value (typically 3), but where N can be modified based on calling and call party history or for other reasons.

Another feature that can be optionally applied to the process shown in FIG. 2 and described above relates to adding authorized third parties to a call. In one example, an inmate calling party may want to place a call to an attorney who is on his/her allowed called party list, but is having difficulty reaching the desired attorney, or having a collect call accepted by the attorney. In such circumstances, ICS calling parties sometimes seek to have an authorized called party, e.g., an authorized relative or friend, seek to add a link to the attorney to an on-going call between the ICS inmate calling party and that authorized called party. In short, a three-way is sought to be established that includes the attorney. However, many confinement institutions and/or ICS service providers do not allow 3-way calls of any kind. Thus, when an attempt is made to add an attorney on to the on-going call using prior techniques, anomalies occurring during the attempt to set up the 3-way are detected and the call is terminated. This is the case even if the attorney is on the allowed called party list for the inmate calling party, i.e., the attorney is typically identified in call privileges database in the description of FIG. 1.

The present invention in some of its illustrative embodiments optionally provides a method for allowing the joining of two authorized called parties to a bridged (conference) call with an ICS inmate calling party. In one embodiment, an MSG 6, Step 285, is played on the link between the ICS system and the called party instead of MSG 5. Illustratively analyses performed at Step 260 result in selecting either MSG 5 or MSG 6 via path 217 in FIG. 2, but not both, for delivery to the called party. Since at least one DTMF digit will be expected in response to MSG 6, it proves advantageous to have the selecting signal (MSG 5 or MSG 6) provided as a SAMA input to anomaly monitoring unit 210, so that particular received digits (exemplary digits, such as 1, 6 or 7 in the example to follow) are not treated as anomalies after MSG 6 is played.

In MSG 6 the ICS system will again note that signal conditions have not been resolved. But, rather than inviting a hang up and offering a continuation call (as in MSG 5), the ICS system will, at least tacitly, but without certainty regarding detected anomalies, raise the possibility that a 3-way call attempt had been made, or was underway, when one or more anomalies were detected at Steps 210 and 220. In particular, MSG 6 will include words to this effect: "If you were attempting to add another authorized party to this call, perhaps an attorney or other person who has previously been approved to receive calls from the inmate calling party at (jail name), please be advised that the only way a such party can be added is by using (name of ICS service provider) to make that add-on. Other attempts to add a party to this call will be blocked. If you wish to add a party to this call at this time, please press the "7" key after this message is finished. Any call to a party added on to this call will be subject to additional charges equal to charges that would be imposed if the inmate calling party had placed the call directly to the party to be added. If you would like this message repeated, please press 1 now." This and other messages recited herein are merely illustrative; other or further messages can be used instead to accommodate ICS requirements or preferences, or to serve other particular goals.

As shown in FIG. 2, SAMA information arriving at monitoring Step 210 via input 217 will advantageously adjust the span of anomaly detection to temporarily avoid detecting selected DTMF digits from being identified as anomalies. Rather, as shown as outputs from Step 210, outputs otherwise used by the ICS system to "Repeat the last MSG" and "Add-on Party Information" (e.g., add-on party telephone number information) are provided at Step 210 instead of anomaly detection information. Use of such information will be described below.

If a DTMF signal for a "1" (or other specified digit) is received in response to this announcement, the message will be replayed up to some predefined number Na (a for "add-on") times. If a DTMF signal for a "7" (or other specified digit) is received after playing MSG 6, the ICS system will play MSG 7, which will be to this effect: "Thank you for requesting that (ICS service provider) provide an authorized 3-way call by adding an authorized third party to this call. Please key in the full telephone number for the party you wish to add on, including area code, if needed. We will check to verify that the number you provide is an authorized number for the party calling from (jail name) to call. You are reminded that any call to a party added on to this call will be subject to additional charges equal to charges that would be imposed if the inmate calling party had placed the call directly to the party to be added. Please confirm that you wish to have this party added on to this call by pressing a 7 key again now. If you do not want to add the additional party to this call, please press 6 and you will be presented with the option of simply having your original call continued."

As noted above, outputs from the monitoring Step 210 (when modified by SAMA information on input 217) prove useful in activating the playing of the appropriate MSGs and obtaining the telephone number of a desired add-on party.

When information regarding the desired $3^{rd}$ party is received from Step 210 it is preferably used in the same general manner as called party information received from the original inmate calling party. That is, a call is placed and an announcement made upon answer that the call is from an inmate at (jail name) and asks if the call will be accepted. It will be made clear, however, that acceptance does not indicate an obligation on the added-on party to pay for the call. Instead, the call to the added-on party will be an additional part of the conference that was originally established when the original called party accepted and agreed to pay charges. The additional charges for the call to the added-on party will be included in the charges assumed by the original called party. In some cases, the message presented to the added-on party may include a statement regarding the presence on the call of another party selected by the inmate calling party to help in introducing the call to the added-on party. The message may further provide information that this other party may be selectively blocked by the added-on party so that a privileged conversation, if any is to occur, will not be compromised.

If the add-on call is accepted by the added-on party, the original called party and the original inmate calling party will be bridged together in a conference call. As noted, privileged conversations between an attorney and the inmate calling party can be assured by action (such as keying a "7" digit) of the attorney. Such keying will permit the exclusion of the original called party (to be restored by keying a "6" when privileged matters are not under discussion) and by blocking recording by call recording unit 145, when the added-on party is an attorney that has been previously authorized to receive calls from the original calling party—as confirmed by reference to call privileges database 165.

While the foregoing description of an embodiment of authorized 3-way call completion have been phrased in the context of an add-on of an authorized third party to an on-going two-party call. Those skilled in the art will recognize that a similar result can readily be achieved if both the called party and a desired third party (e.g., the inmate calling party's attorney) can be effected for both called parties by reference to the inmate calling party's entries in call privilege database 165. That is, if both of the called parties to be added can be verified to be authorized called parties, and both are authorized to participate in 3-way calls with designated other authorized called parties (here, by way of example, an authorized relative and an authorized attorney), then the message explaining the nature of the call and requesting acceptance can be sent to both of the authorized called parties at the same time. Acceptance can likewise be conditioned on whatever limitations (such as absence of the non-attorney party at selected times)—all at a time prior to bridging the inmate calling party to the call. It will be apparent to those skilled in the art how to adjust delivery and content of messages described above to achieve the desired authorized 3-way call.

For billing and archival purposes, all of the call events described above will be entered in the call event record 140.

While particular analyses have been noted in connection with processing of call anomalies, it should be understood that many additional or alternative analyses will be appropriate either alone or in combination for particular calling circumstances. For example, the identity of calling and called parties, past history of one or both parties to a current call (with each other or with others), non-anomalous signal conditions present on the line, or the nature of the detected anomalies, among many other factors or alternatives, may dictate or allow particular analytical techniques to be used.

Figure 3:
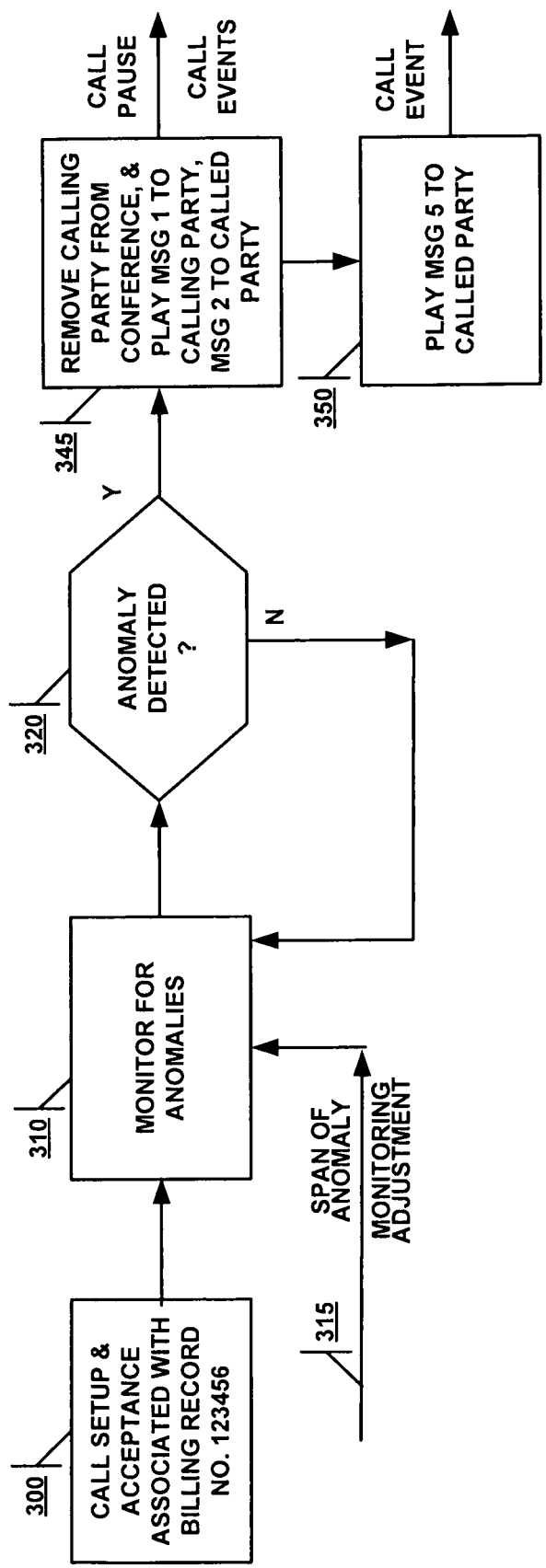
FIG. 3 is a flowchart illustrating a simplified version of the processes illustrated in FIG. 2.

FIG. 3 presents a simplified call anomaly processing arrangement based on that shown in FIG. 2. The FIG. 3 arrangement includes only a continue call alternative when an anomaly is detected. Thus, after call setup, acceptance by the called party and origination of a billing record (with call recording already in operation), monitoring for anomalies is performed at Step 310 with direction provided by SAMA information on input 315. If an anomaly is detected that is within the imposed span, then a call pause is introduced: the inmate calling party is removed from the conference at step 345 and MSG I is played to the inmate calling party. MSG2 is then played to the called party. But, the analyses performed in accordance with FIG. 2 are not necessarily performed in the FIG. 3 processing. Instead, MSG 5 is played, inviting the called party to hang up and prepare to receive a continued call. As in the case of processing in accordance with FIG. 2, the caller will advantageously be requested to key a digit, say a "3" to indicate the inmate calling party's intention to hang up in anticipation of a continued call. If the requested digit is not received within a reasonable period, e.g., fifteen seconds, MSG 5 will be repeated. This may be performed up to a predetermined number of times, if needed, then an announcement will be made that the call will be terminated. If the called party hangs up after indicating his/her intention to do so, and if a continuation call is placed to the original called party, and if that call is accepted by the called party, then the inmate calling party will be restored to the conference as it was before the call pause. No charges will be made for the time the call was paused.

The anomaly detection and call pause steps shown in FIG. 3 and described above (leading to a continuation call) can be repeated a predetermined number of times. After what might well be repeated attempts to place a 3-way call (without success) the call may, at the option of the ICS service provider, be terminated. Alternatively, after one or more repetitions of the process of FIG. 3, MSG 6 can be played to determine if the parties are attempting to place a 3-way call, and offering to facilitate the placing of a 3-way call to include an additional authorized called party as described in connection with FIG. 2. Since the processing of FIG. 3 does not include the possibly extensive analysis steps of the FIG. 2 process, it will, in some cases at least, be preferable to adjust the span of anomaly monitoring to be somewhat more inclusive that a selected default span might be for the FIG. 2 process. In any event, anomaly detection at Steps 310 and 320 will remain sufficiently stringent to avoid with a high degree of certainty that no undetected 3-way call attempts are successful. The approach of FIG. 3 processing is not, however, the same as present 3-way detect methods because such present techniques merely detect something that may be a 3-way attempt (because of a lowered threshold), but provide only for call termination. The present invention, including the embodiment of FIG. 3 allow for a continuation call that preserves the integrity of the 3-way attempt detection requirements while not burdening call participants with increased call charges.

Figure 4:
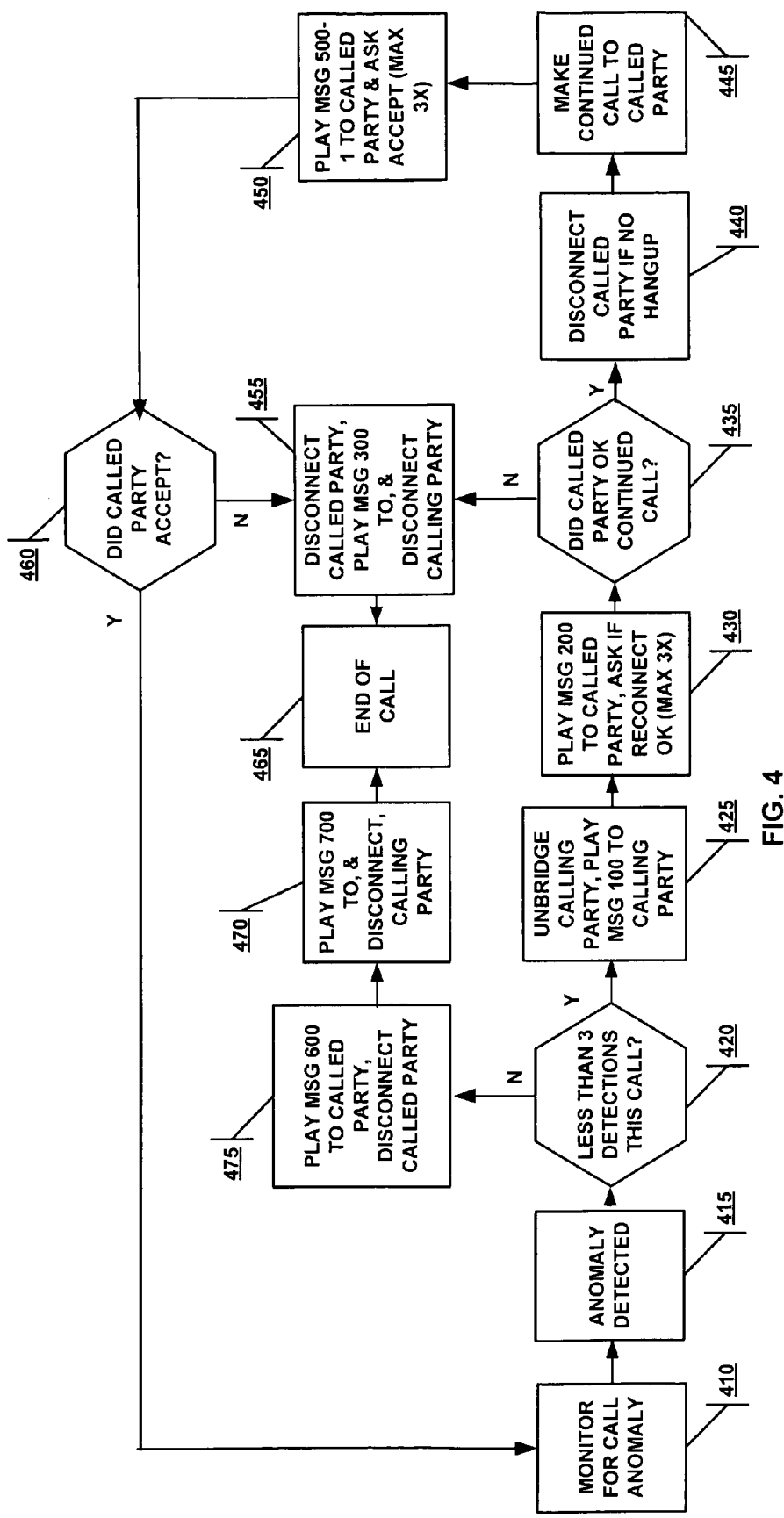
FIG. 4 is a flowchart illustrating an alternative call anomaly processing process based on those shown in FIGS. 2 and 3.

FIG. 4 presents a modified representation to the anomaly detection and continued call functions described above. Inf FIG. 4, Step 460 occurs when the called party responds to the query regarding willingness to accept and pay for the incoming call, after appropriate call identification. If the answer is yes, then monitoring continues at Step 410, any anomalies are detected at Step 415 and a test for the extent of anomalies is made at Step 420. In the illustrative example shown in FIG. 4, if a predetermined number (here 3) anomalies has been detected, then a message (called MSG 600) is played to the called party to explain the presence of unexplained anomalies, and the called party is disconnected. Then a similar message (called MSG 700) is played to the calling party and the calling party is disconnected. This ends the call, as shown at Step 465.

If fewer than 3 anomalies have been detected (in the illustrative example), then the calling party is unbridged at step 425 and the message indicating a pause is played to the calling party. At step 430 the message (200) is played to the called party and approval is sought to provide a continued call. If the called party assents (Step 435) the called party is disconnected (if the called party has not already hung up) and a continued call is placed. After the continued call is placed the called party is again allowed to accept or not, and the the loop of FIG. 4 continues. This loopin is allowed to occur a predetermined maximum number of times (here, 3) or until the called party choose not to have the call continued (at Step 435). If placing a continued call would exceed the allowed threshold number of continued calls (or if the called party chooses not to continue), then the ICS executes Step 420 (or Step 455) and the call is ended after playing messages of the type previously described to the calling and called parties.

It will be recognized that one aspect of the embodiment shown in FIG. 4 is delivery of announcements three times (Step 450), and the allowance of up to three continuations (Step 420) in a particular embodiment of the present invention shown in FIG. 4. An explicit hang up by the ICS system when the called party does not hang up is provided in Step 440, and an explicit approval to hang up in anticipation is provided in Step 430 (and tested in Step 435).

Many of the processes described above will be adapted for use in other particular calling situations, and with other particular call treatment options, as will occur to those skilled in the art. While the emphasis in the preceding description has been on the establishment and selective maintenance of telephone calls, it will be understood that the term telephone call will include a variety of terminal devices, fixed and mobile. Thus, for example, the step of bridging a first call from a calling party to an ICS system with a second call from the ICS system and one or more called parties, should be understood to include other than switched circuit, hard-wired calls telephone calls. In particular, such more traditional calls are but examples of the current variety of widely available analog, digital, packet, streamed, wireless or other links and combinations of such links. Likewise, it will be understood that call and calling and other variations of such words is fully intended to include the provision of means for delivering messages and sounds having a variety of characteristics that can be monitored for the presence or absence of constituents, components, frequencies and anomalies of a variety of types.

ICS 1100 will be understood to be located in a single location or distributed between or among more than one location or nodes. One or more of such ICS nodes will include components for performing a bridging function at which a communications (e.g., telephone) calls or links are bridged with one or more calls or links to provide a path from a calling party to at least one called party.

What is claimed is:

1. A method for selectively establishing and maintaining a communications path through a network for a call from a calling party to a called party, said communications path having a plurality of links and having a plurality of measurable signal conditions, said communications path being subject to restrictions on allowed calling and called parties, the method comprising
    establishing a first of said links from said calling party to a bridging node in said network,
    establishing a second of said links from said bridging node to said called party, establishing of said second link being conditioned on acceptance of said call from said calling party,
    at said bridging node, establishing a bridge between said first link and said second link,
    monitoring at least one of said links for the presence of predefined anomalous signal conditions on said links,
    when anomalous signal conditions that exceed a predetermined threshold are detected, removing said first link from said bridge and delivering a message that an anomaly has occurred and that measures are being undertaken to avoid such anomaly,
    when such measures undertaken to avoid such anomaly are not successful, requesting said called party to terminate present participation in the call and to receive a continuation of the call over a new second link bridged at the bridging node to said calling party and connecting the continuation of the call, wherein a single per call service charge is charged for the call such that there is no additional per call service charge for the continuation of the call.

2. The method of claim 1 further comprising providing a call recording to a call monitor.

3. The method of claim 2 further comprising providing the call recording with special attention information flagging the call as including indications of an attempted 3-way call.

4. The method of claim 1 wherein said monitoring at least one of said links for the presence of predefined anomalous signal conditions on said links comprises using a history of the calling party having engaged in 3-way calling.

5. The method of claim 4 wherein because of the history of the calling party having engaged in 3-way calling, the monitoring comprises an increased level of analysis.

6. The method of claim 1 wherein the continuation call does not result in any additional charges for the call beyond those for a period of the call in which both parties are able to take part.

7. The method of claim 1 wherein said predetermined threshold is based at least in part on an infrastructure of the network.

8. The method of claim 1 wherein said predetermined threshold is based at least in part on call volume.

9. The method of claim 1 wherein said predetermined threshold is based at least in part on observed conditions and prior experience with particular threshold values.

10. The method of claim 1 further comprising providing a reference to the called party for referencing the anomaly in future communications with a call provider.

11. The method of claim 1 wherein calls from the calling party are subject to a per call service charge unless the single per call service charge is applied to prevent the additional per call service charge from being charged for the continuation of the call.

12. The method of claim 1 wherein the call and continuation of the call are associated with a single billing record number that is used to identify the call.

13. The method of claim 1 wherein the call and continuation of the call are associated with a separate billing record numbers and linking information associates the call with the continuation of the call.

14. A method comprising:
selectively establishing and maintaining a communications path through a network for a call from a calling party to a called party, said communications path having a plurality of links and having a plurality of measurable signal conditions, said communications path being subject to restrictions on allowed calling and called parties, the communication path established by establishing a first of said links from said calling party to a bridging node in said network and establishing a second of said links from said bridging node to said called party and, at said bridging node, establishing a bridge between said first link and said second link;
monitoring at least one of said links for the presence of predefined anomalous signal conditions on said links;
when anomalous signal conditions that exceed a predetermined threshold are detected, requesting input from said called party; and
requesting said called party to terminate present participation in the call and to receive a continuation of the call over a new second link bridged at the bridging node to said calling party, wherein the continuation call is connected, wherein a single per call service charge is charged for the call such that the continuation of the call does not result in an additional per call service charge.

15. The method of claim 14 wherein requesting said input from said called party comprises requesting the called party to press a same digit as was used to accept the call.

16. The method of claim 14 further comprising connecting the continuation of the call, wherein monitoring for the presence of predefined anomalous signal conditions continues with increased scrutiny.

17. The method of claim wherein 16 the increased scrutiny comprises using a different predetermined threshold.

18. The method of claim 14 wherein the continuation call does not result in any additional charges for the call beyond those for a period of the call in which both parties are able to take part.

19. The method of claim 14 further comprising providing a call recording to a call monitor, wherein the call recording is provided with special attention information flagging the call as including indications of an attempted 3-way call.

20. The method of claim 14 wherein said monitoring at least one of said links for the presence of predefined anomalous signal conditions on said links, wherein because of a history of the calling party having engaged in 3-way calling, the monitoring comprises an increased level of analysis.

21. A method comprising:
selectively establishing and maintaining a communications path through a network for a call from a calling party to a called party, said communications path having a plurality of links and having a plurality of measurable signal conditions, said communications path being subject to restrictions on allowed calling and called parties, the communication path established by establishing a first of said links from said calling party to a bridging node in said network and establishing a second of said links from said bridging node to said called party and, at said bridging node, establishing a bridge between said first link and said second link;
monitoring at least one of said links for the presence of predefined anomalous signal conditions on said links;
when anomalous signal conditions that exceed a predetermined threshold are detected, requesting input from said called party; and
requesting said called party to terminate present participation in the call and to receive a continuation of the call over a new second link bridged at the bridging node to said calling party, wherein the continuation call is connected and is allowed to continue until both parties are able to take part in the call, including the continuation call, for a predetermined allowed talk time, wherein the predetermined allowed talk time is a facility allowed talk time.

* * * * *

UNITED STATES PATENT AND TRADEMARK OFFICE
CERTIFICATE OF CORRECTION

PATENT NO. : 8,654,956 B2
APPLICATION NO. : 12/378507
DATED : February 18, 2014
INVENTOR(S) : William Ryan et al.

It is certified that error appears in the above-identified patent and that said Letters Patent is hereby corrected as shown below:

On the Title Page:

Item (12) "Ryan, III et al." should be corrected to read -- Ryan et al. --

Below the title, the paragraph beginning with "(75) Inventors:"

delete "III" in inventor William Ryan's name

Kindly correct the spelling of inventor William Ryan's name to read as follows:

William Ryan, Greensboro, NC (US)

delete the "," in John Vincent Townsend III's name

Kindly correct the spelling of inventor John Vincent Townsend III's name to read as follows:

John Vincent Townsend III, Kernersville, NC (US)

Signed and Sealed this
Twenty-seventh Day of May, 2014

Michelle K. Lee
*Deputy Director of the United States Patent and Trademark Office*